Dec. 22, 1959     T. L. SHERMAN     2,917,931
CAGE CONTROL DEVICE FOR SLANT TYPE ENGINE
Filed June 13, 1955     2 Sheets-Sheet 2

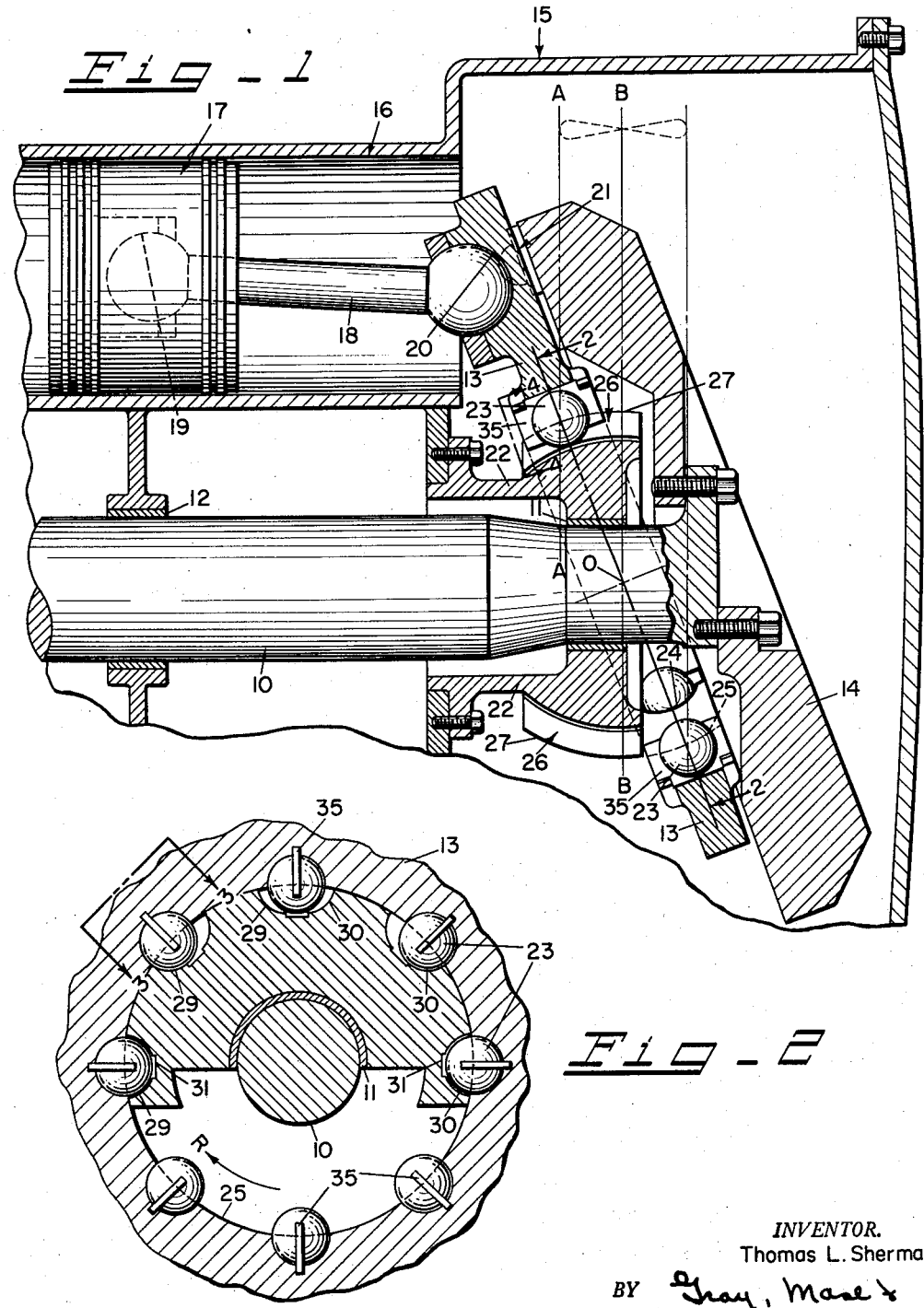

INVENTOR.
Thomas L. Sherman
BY Gray, Mase &
Dunson
ATTORNEYS.

United States Patent Office 2,917,931
Patented Dec. 22, 1959

2,917,931

CAGE CONTROL DEVICE FOR SLANT TYPE ENGINE

Thomas L. Sherman, Worthington, Ohio, assignor, by mesne assignments, to The Battelle Development Corporation, Columbus, Ohio, a corporation of Delaware Application June 13, 1955, Serial No. 515,079

8 Claims. (Cl. 74—60)

This invention relates to a crankless-motion conversion mechanism and, more particularly, to a new and novel device that is characterized by the use of spherical surface load-carrying members for angular control of a non rotative, oscillating member or cage in said mechanism.

In crankless-motion conversion mechanisms, reciprocating motion is converted into rotary motion, or vice versa, by a rotative slant or swash plate. This motion conversion may be accomplished through the means of a nonrotative, oscillating member or cage to which the reciprocating elements are connected. A slidable engagement of the cage is provided with the slant which, in turn, is secured to a shaft. The slidable engagement of the cage and the slant causes the slant and attached shaft to rotate as the cage oscillates under tangential or angular control.

The present invention comprises a cage angular-control device having spherical surface load-carrying members preferably located partially within sockets preferably on the inner periphery of the cage. These spherical surface load-carrying members, preferably located at equally spaced intervals in sockets on the inner periphery of the cage, have rolling contact with a similar number of equally spaced pairs of guide surfaces on the outer periphery of a mount secured to the frame.

The present invention is an improvement over prior-art devices. The superior compactness of construction combines with the relatively low frictional losses from the application of spherical surface load-carrying members for angular control of the cage to give a new and novel device. The invention is particularly suited for the crankless-motion mechanism of U.S. Patent 2,475,295; but it is not limited thereto, in that it may be used for angular control in other mechanisms for conversion of reciprocating into rotary motion, or vice versa.

Crankless-motion conversion mechanisms have been utilized in combustion engines, blowing and pumping units, and other apparatus well known to those skilled in the art. Some prior-art means for angular control of cage members of crankless-motion conversion mechanisms have been extensions of a nonrotative, oscillating member or cage, meshing with cam guides on the mount, or with guides attached to the block or casing. These prior-art devices usually occupied excessive space, usually were limited in number or had small load-carrying capacity, frequently had high frictional losses or underwent serious wear, sometimes required special lubrication devices or manual adjustment and frequent maintenance and repair, and, generally, in many applications would not be as efficient or practical as this invention.

The object of the invention is to provide a novel and improved control device for the nonrotative, oscillating member or cage of a crankless-motion conversion mechanism that is constructed and arranged so as to insure the reciprocation of every point on the cage in a path substantially parallel to the shaft and to prevent undue lateral or tangential displacement of said cage, relative to the reciprocating elements, of such magnitude as to cause undesirable movements or strains.

Another object is to provide an improved and efficient device for preventing rotation of the cage in a crankless-motion conversion mechanism and for controlling the cage to a symmetrical angular movement by superior compactness of construction combined with the application of spherical surface load-carrying members.

Another object is to provide an improved and efficient device for controlling the oscillating movement of a cage of a crankless-motion conversion mechanism by the novel application of spherical surface load-carrying members, whereby the well-known advantages of the low frictional properties of a load-carrying spherical surface is obtained.

Still another object is to provide an efficient mechanism, occpying a small amount of space, for angular control of the cage of a crankless-motion mechanism wherein said cage is capable of being supported by a plurality of spherical surface members of relatively small size.

Other objects and advantages of the invention will be apparent from the description, accompanying drawings, and the appended claims.

In the drawings:

Fig. 1 is a view in vertical section of a portion of a crankless-motion conversion mechanism showing an embodiment of the novel mechanism for angular control of the cage member;

Fig. 2 is a partial sectional view taken along the line 2—2 of Fig. 1;

Figure 3:
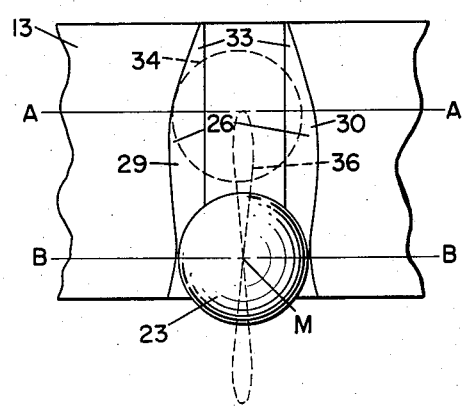
Fig. 3 is an enlarged view taken over the length of line 3—3 of Fig. 2 and includes a diagram showing the locus of movement of the spherical surface member during the operation of the crankless-motion conversion mechanism.

The invention provides, in a crankless-motion conversion mechanism, a cage control device comprising spherical surface load-carrying members rotatably mounted, preferably on the inner periphery of the cage with said members having journal contact with the cage and rolling contact with pairs of guide surfaces on the outer periphery of a mount; or alternatively, members on the outer periphery of a mount with said members having journal contact with the mount and rolling contact with pairs of guide surfaces on the inner periphery of the cage.

In Fig. 1 there is shown a portion of a crankless-motion mechanism comprising a main shaft 10 located in suitable bearings 11 and 12. Bearing 11 is substantially in the plane of the center of oscillation O of cage 13 mounted facing a slant or swash plate 14 secured to shaft 10. Bearing 12 is affixed to a portion of a casing 15. The shaft 10 may be mounted in additional suitable bearings, not illustrated, that are affixed to the casing 15.

The block or casing 15 is provided with a plurality of cylinders, generally designated 16, substantially parallel to shaft 10 and uniformly disposed in a circle about the shaft 10. In Fig. 1 the cage 13 receives the reciprocating motion of a plurality of pistons or reciprocating elements, generally designated 17, which reciprocate in cylinders 16. A piston rod 18 is connected at one end to piston 17 and at the other end to the cage 13 through spherical socket bearings 19 and 20, respectively. Bearing elements, generally designated 21, which are attached to cage 13, slidably engage the slant 14.

A mount 22, secured to casing 15, holds bearing 11 and encircles the shaft 10.

The cage 13 is prevented from rotation by a plurality of balls or spherical surface load-carrying members 23 each rotatably mounted and partially encased in an individual socket 24 on the inner periphery 25 of the cage 13. The spherical members, as shown in the illustration of Fig. 1, are balls 23.

Where throughout the following specification and claims the term balls is used, it is to be understood as inclusive of all types of spherical surface members including solid spheres, hollow spheres, and spherical surface rollers.

The balls 23 are located at equally spaced intervals in sockets 24 around the inner periphery 25 of the cage 13. The balls 23 contact a similar number of equally spaced pairs of guide surfaces, generally designated 26, integrally formed or otherwise affixed to the outer periphery 27 of the mount 22. Pairs 26 of guide surfaces on the outer periphery 27 of the mount member 22 extend in a substantially longitudinal direction parallel with respect to the shaft 10 and occupy all or the greater portion of the width of the mount 22.

A bottom clearance groove 31, as shown in Fig. 2, is provided between the side surfaces 29 and 30 of the pairs 26 of guide surfaces immediately below balls 23. In the plane at right angles to the main shaft 10, the curvature of each side guide surface 29 and 30 of pairs 26 of guide surfaces is slightly greater than that of the surface of the balls 23.

Figure 4:
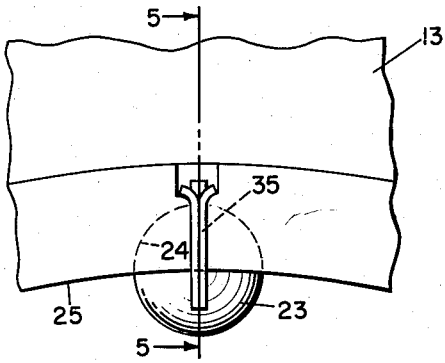
Fig. 4 is an enlarged elevational view taken over the length of line 4—4 of Fig. 1 of a portion of the cage member including a spherical surface load-carrying member.
Figure 5:
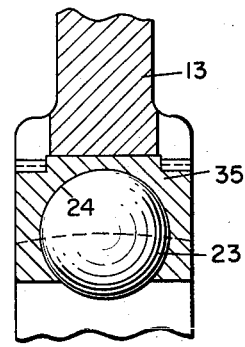
Fig. 5 is a sectional view taken over the length of line 5—5 of Fig. 4.

A means consisting essentially of a flat plate member 35 is provided for retention of the balls 23 partially within the socket 24 on the inner periphery 25 of the cage 13 as shown in Figs. 4 and 5. The flat plate member 35 is affixed to the cage 13 and partially encircles the ball 23 retaining the ball 23 from radial displacement from the socket 24.

Figure 6:
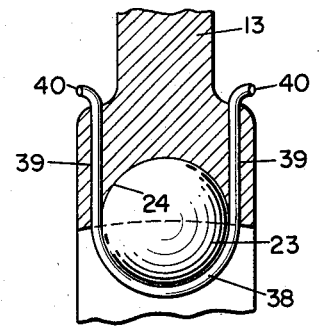
Fig. 6 is a sectional view of a portion of a cage member with a spherical surface load-carrying member retained within the socket on the inner periphery of the cage by an alternate means.

As shown in Fig. 6, an alternative means may be provided for retaining the balls 23 partially within the socket 24 on the inner periphery 25 of the cage 13. A wire U-shaped clip 38 partially encircles the ball 23 and passes through holes 39 in the cage. The ends 40 of the legs of the U-shaped wire clip 38 after passing through the holes 39 are turned or bent over so that the wire clip will be held by the cage 13.

In the operation of the invention with the crankless-motion conversion mechanism as illustrated, pistons 17 reciprocate in cylinders 16 of casing 15 and cause reciprocating or oscillating motion of the cage 13 by means of the piston rods 18 and spherical socket bearings 19 and 20. The oscillating motion of the cage 13 is converted to rotary motion of the slant 14 by a slidable engagement of bearing elements 21 of the cage 13 with the slant 14. The slant 14, being secured to the main shaft 10, rotates, thus causing the main shaft 10 to rotate. The main shaft 10 rotates in suitable bearings, one of which is designated 11. In those instances in which the crankless-motion conversion mechanism is an engine, power take-offs may be attached to the main shaft 10.

The piston load conveyed by the rods 18 is transmitted through socket bearing 20, through the nonrotative, oscillating member or cage 13, and from there through bearing elements 21 to the slant 14, thereby causing rotation of said slant 14. The inward or radial reaction from bearing elements 21 is transferred through the cage 13 to the outer periphery 27 of the mount 22. The tangential or torque reaction is transferred to pairs 26 of guide surfaces.

During oscillation, the cage 13 is held to a reciprocating or oscillating motion substantially parallel to the main shaft 10 and is prevented from more than slight variation from its natural universal movement by the device of this invention. As illustrated in Fig. 2, in the preferred embodiment, balls 23, rotatably mounted partially within sockets 24 on the inner periphery 25 of the cage 13, roll and guide on the pairs 26 of guide surfaces on the outer periphery 27 of the mount 22.

The balls 23 roll on the pairs 26 of guide surfaces with the rolling contact occurring on side surface 29 when the tangential reaction on the cage 13 is in one direction. When the reaction is in the opposite direction, the balls 23 have rolling contact with the opposite side surface 30 of the pairs 26 of guide surfaces. Under actual operating conditions the applied torque is unidirectional and side guide surface 29 only will be loaded when slant rotation is in direction R, as illustrated in Fig. 2. A running clearance is provided so that side surface 30 will only be used at starting or for unusual operating conditions. It will be realized that the close angular spacing of the pairs 26 of guide surfaces permitted by the construction of the invention will insure that more than one ball 23 will be simultaneously in contact with the pairs 26 of guide surfaces. Because of this it is possible to arrange that the end contours on the pairs 26 of guide surfaces be modified in the nature of ramps 33 so that the beginning of contact between each ball and each guide surface will be a smooth comparatively shockless contact engagement. A broken line 34 in Fig. 3 represents a moved position of ball 23 and illustrates the ball 23 in contact with guide surface 29. The ramps 33 merge into each guide surface, thus permitting the comparatively shockless contact engagement at the beginning of contact between each ball and guide surface.

To secure true symmetrical or universal motion of the cage 13 and to avoid irregular angular inertia effects, the balls 23 follow a locus of movement substantially in the form of a lemniscate as determined by the side guide surfaces 29 and 30. As shown in Fig. 3, a broken line represents the path 36 of the center M of the ball 23 during a half oscillation of the cage 13 from plane A—A to plane B—B. Thereafter the guide surfaces do not exist and consequently the balls are free from any contact.

In mechanisms operating at high speeds or with heavy piston loads, depending on the number of spherical surface load-carrying members utilized, the loading of cage 13 on mount 22 may be too large for the balls 23 to carry and the latter are protected by the use of clearance groove 31. Under such circumstances means, such as illustrated by this inventor in Patent 2,475,295 wherein the cage is not supported radially by the rotary slant or main shaft, but by the spherical surface of a fixed support mount independent of the slant and directly attached to the casing of the engine, and other suitable means well known and obvious to those skilled in the art, may be used to carry the cage loading in part or its entirety with this invention used to control the angular motion of the cage.

In some crankless-motion mechanisms, the radial loading on the cage is low enough that it is not necessary to have a substantially spherical periphery for the inner surface of the cage and in these mechanisms the outer periphery of the mount also need not be substantially spherical, the cage need not contact the mount, and no clearance groove 31 need be supplied below the balls. In these mechanisms the cage radial reactions will be transferred to the balls 23 and therefrom to the mount.

Figure 7:
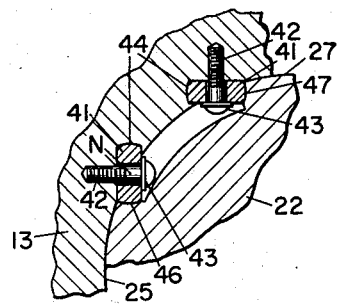
Fig. 7 is a sectional view of a second embodiment of the invention having a modified form of a spherical surface load-carrying member.

An embodiment of a spherical surface member that is suitable for use with crankless-motion conversion mechanisms, in which the applied torque is only in one direction, is shown in Fig. 7. A plurality of rollers 41, which are substantially sections of a sphere, are rotatably mounted around the inner periphery 25 of the cage 13.

Retaining means for the rollers 41 comprise for each roller an individual threaded shaft 42 with a suitable head 43. The threaded portion of the shaft 42 is in threaded engagement with the cage 13 and locates the roller 41. The spherical surface 44 of one roller 41 rotates in the cage 13 and on a guide surface 46, integrally formed or otherwise affixed to the outer periphery 27 of a mount 22 when the crankless-motion conversion mechanism operates in one direction. When the crankless-motion conversion mechanism operates in the reverse direction, or when the applied torque is in the opposite direction, then another roller 41, which has a spherical surface 44, rotates in the cage 13 and rolls on a guide surface 47. During the oscillation of the cage 13, the center point N of the roller 41 moves in a locus of substantially lemniscate form, such as illustrated in Fig. 3, by the path 36.

While the preferred embodiment of this invention, in which balls are located partially within sockets on the inner periphery of the cage and have rolling contact with pairs of guide surfaces formed on the outer periphery of the mount, has been illustrated in Figs. 1 and 2, various alternatives of this invention obvious to those skilled in the art are to be understood as being included in this invention. The converse of the illustrated embodiment, in which balls are rotatably mounted and retained partially within sockets located on the outer periphery of the mount and have rolling contact with pairs of guide surfaces on the inner periphery of the cage, is an alternative not illustrated. Another alternative, not illustrated, is the converse of the embodiment illustrated in Fig. 7. This alternative consists of spherical surface rollers rotatably mounted around the outer periphery of the mount with these rollers having rolling contact with pairs of guide surfaces on the inner periphery of the cage.

Means other than those illustrated in Figs. 4, 5, and 6, for retaining the spherical surface members partially within sockets, will be obvious to those skilled in the art and are encompassed as being ball-retaining means suitable for the invention.

Mounts for crankless-motion mechanisms other than have been illustrated, wherein a plurality of pieces have been assembled to form a mount, may be suitable mounts for crankless-motion mechanisms incorporating the invention. For example, a plurality of split members combined with a circular ring having an outer periphery with pairs of guide surfaces may form a suitable structure for a mount.

While a specific cage has been illustrated in the drawings and description, it is to be understood that cages other than have been illustrated may be suitable cages for crankless-motion mechanisms incorporating the invention. The cage of Fig. 1 is suitable for loads from pistons 17 applied by compression through piston rods 18. In some crankless-motion mechanisms, wherein these load conditions may result in tension, the cage may be modified to embrace the periphery of the slant as shown in U.S. Patent 2,475,295 by bridge member 81 in Fig. 2.

The novel and improved guiding means for the cage of the crankless-motion conversion mechanism of the invention provides load-carrying and/or guide members with spherical surfaces arranged at equally spaced intervals and having rolling contact with a similar number of pairs of spaced guide surfaces. Preferably said spherical surface members are mounted on the inner periphery of the cage member and said pairs of guide surfaces on the outer periphery of a mount located on the frame. Alternatively, the converse where said spherical surface members may be on the outer periphery of a mount on the frame and said pairs of guide surfaces may be on the inner periphery of the cage member is included in this invention. The invention permits freedom for true oscillatory motion of the cage with accurate angular control of the cage movement and with a minimum of frictional wear on the guide device, thus permitting construction of an improved, efficient, and compact crankless-motion conversion mechanism.

It will be understood, of course, that, while the forms of the invention herein shown and described constitute preferred embodiments of the invention, it is not intended herein to illustrate all of the possible equivalent forms or ramifications of the invention. It will also be understood that the words used are words of description rather than of limitation, and that various changes, such as changes in shape, relative size, and arrangement of parts that are obvious to one skilled in the art, may be substituted without departing from the spirit or scope of the invention herein disclosed.

What is claimed is:

1. In a crankless-motion conversion mechanism, having a fixed mount, a rotative slant, and a cage adapted to oscillate with respect to said mount and to slidably engage said slant for conversion of reciprocating motion into rotary motion, or vice versa, the combination therewith, located intermediate the cage and a fixed element of the mechanism and linking the cage with the fixed element, of: a plurality of guide surfaces; a plurality of sockets, the plurality of guide surfaces and the plurality of sockets located on the cage and the fixed element; and a plurality of spherical surface load-carrying members, each member rotatably mounted in and partially encased in one of said sockets, at least one of said spherical surface members adapted to have said spherical surface in rolling contact with at least one of said guide surfaces when at least one of said spherical surface members has said spherical surface spaced from said plurality of guide surfaces; whereby the oscillatory movement of said cage is controlled.

2. The combination of claim 1 including a cage having said plurality of sockets located at equally spaced intervals around the inner periphery of said cage, and a fixed mount having said plurality of guide surfaces on the outer periphery of said mount.

3. The combination of claim 1 including a cage having said plurality of guide surfaces on the inner periphery of said cage, and a fixed mount having said plurality of sockets located at equally spaced intervals on the outer periphery of said mount.

4. In a crankless-motion conversion mechanism for conversion of reciprocating motion into rotary motion, or vice versa, by a rotative slant, a cage angular control device located intermediate a cage and a fixed element of the mechanism and linking the cage and the fixed element, the device comprising the combination of: a plurality of pairs of guide surfaces substantially in the configuration of a portion of a lemniscate; a plurality of sockets, the plurality of pairs of guide surfaces and plurality of sockets located on the cage and the fixed element of the mechanism; a plurality of spherical surface load-carrying members, each member rotatably mounted in and partially encased in one of said sockets, at least one of said spherical surface members having said spherical surface in rolling contact with at least one of said guide surfaces when at least one of said spherical surface members has said spherical surface spaced from said plurality of guide surfaces; and retaining means for holding said members in said sockets; whereby during angular movement of said cage a point on said cage follows a locus substantially the configuration of a lemniscate.

5. A device as in claim 4 including a fixed mount having said plurality of pairs of guide surfaces on a spherical outer periphery, and a cage having said plurality of sockets located at equally spaced intervals around an inner periphery.

6. A device as in claim 4 including a fixed mount having said plurality of sockets located at equally spaced intervals around a spherical outer periphery, and a cage having said plurality of pairs of guide surfaces on an inner periphery.

7. The combination of claim 1 including said plurality of sockets on the periphery of said cage.

8. A device as in claim 4 including said plurality of sockets on the periphery of said cage.

References Cited in the file of this patent

UNITED STATES PATENTS

| | | |
|---|---|---|
| 1,011,126 | Jones | Dec. 5, 1911 |
| 1,144,808 | Bronner et al. | June 29, 1915 |
| 1,555,165 | Sherman | Sept. 29, 1925 |
| 1,659,374 | Robson | Feb. 14, 1928 |
| 1,885,323 | Duryea | Nov. 1, 1932 |
| 2,430,788 | Sherman | Nov. 11, 1947 |
| 2,702,483 | Girodin | Feb. 22, 1955 |
| 2,737,055 | Dauben | Mar. 6, 1956 |